(12) United States Patent
Vaskova et al.

(10) Patent No.: US 10,489,213 B2
(45) Date of Patent: Nov. 26, 2019

(54) EXECUTION OF A METHOD AT A CLUSTER OF NODES

(71) Applicant: Red Hat, Inc., Raleigh, NC (US)

(72) Inventors: Lenka Vaskova, Geca (SK); Martin Vecera, Brno (CZ)

(73) Assignee: RED HAT, INC., Raleigh, NC (US)

( * ) Notice: Subject to any disclaimer, the term of this patent is extended or adjusted under 35 U.S.C. 154(b) by 479 days.

(21) Appl. No.: 14/504,305

(22) Filed: Oct. 1, 2014

(65) Prior Publication Data

US 2016/0098294 A1    Apr. 7, 2016

(51) Int. Cl.
| | |
|---|---|
| G06F 9/50 | (2006.01) |
| G06F 17/30 | (2006.01) |
| H04L 12/911 | (2013.01) |
| H04L 29/08 | (2006.01) |
| G06F 9/448 | (2018.01) |

(52) U.S. Cl.
CPC ............ *G06F 9/5066* (2013.01); *G06F 9/449* (2018.02); *G06F 9/5072* (2013.01); *G06F 2209/505* (2013.01)

(58) Field of Classification Search
CPC ..... G06F 8/10; G06F 8/20; G06F 8/24; G06F 8/71; G06F 9/4428; G06F 17/30607; G06F 8/315; G06F 8/443; G06F 8/36; G06F 8/70; G06F 9/44521; G06F 16/245; G06F 16/9535; G06F 17/5022; G06F 17/5045; G06F 8/44; G06F 8/52; G06F 16/13; G06F 16/148; G06F 16/164; G06F 16/188; G06F 9/5066; G06F 9/449; G06F 9/5072
See application file for complete search history.

(56) References Cited

U.S. PATENT DOCUMENTS

| | | | |
|---|---|---|---|
| 6,385,643 | B1 | 5/2002 | Jacobs et al. |
| 6,918,013 | B2 | 7/2005 | Jacobs et al. |
| 7,107,285 | B2 | 9/2006 | Von Kaenel et al. |
| 7,349,970 | B2 | 3/2008 | Clement et al. |
| 7,454,755 | B2 | 11/2008 | Jacobs et al. |
| 7,664,818 | B2 | 2/2010 | Wolber et al. |
| 7,707,544 | B2 * | 4/2010 | Beust ........................ G06F 8/30 717/106 |
| 8,494,832 | B2 * | 7/2013 | Krishnan ............ G06F 11/3696 703/22 |

(Continued)

OTHER PUBLICATIONS

Tan et al., A Map-Reduce Based Framework for Heterogeneous Processing Element Cluster Environments, 8 pages (Year: 2012).*

(Continued)

*Primary Examiner* — Thuy Dao
(74) *Attorney, Agent, or Firm* — Haynes and Boone, LLP (57) ABSTRACT

Systems and methods are disclosed for executing a clustered method at a cluster of nodes. An example method includes identifying an annotated class included in an application that is deployed on the cluster of nodes. An annotation of the class indicates that a clustered method associated with the annotated class is executed at each node in the cluster. The method also includes creating an instance of the annotated class and coordinating execution of the clustered method with one or more other nodes in the cluster. The method further includes executing, based on the coordinating, the clustered method using the respective node's instance of the annotated class.

20 Claims, 4 Drawing Sheets

(56) References Cited

U.S. PATENT DOCUMENTS

| | | | | |
|---|---|---|---|---|
| 8,661,449 | B2* | 2/2014 | Rossbach | G06F 9/467 718/106 |
| 8,984,531 | B2* | 3/2015 | Taylor | G06F 8/20 718/102 |
| 9,239,996 | B2* | 1/2016 | Moorthi | G06Q 10/06 |
| 9,323,517 | B2* | 4/2016 | West | G06F 8/65 |
| 9,336,060 | B2* | 5/2016 | Nori | H04L 41/0806 |
| 9,378,065 | B2* | 6/2016 | Shear | G06F 9/5072 |
| 9,424,024 | B2* | 8/2016 | Kannan | H04L 41/5016 |
| 9,507,607 | B2* | 11/2016 | Iordanov | G06F 16/2365 |
| 9,578,088 | B2* | 2/2017 | Nickolov | G06F 9/4856 |
| 9,965,502 | B2* | 5/2018 | Isherwood, Jr. | G06F 12/1425 |
| 2004/0111701 | A1* | 6/2004 | Beust | G06F 8/30 717/108 |
| 2005/0262182 | A1* | 11/2005 | Thole | G06F 9/466 709/200 |
| 2007/0186069 | A1* | 8/2007 | Moir | G06F 9/3004 711/162 |
| 2007/0198979 | A1* | 8/2007 | Dice | G06F 9/466 718/100 |
| 2008/0235682 | A1* | 9/2008 | Oren | G06F 8/31 718/100 |
| 2009/0172327 | A1* | 7/2009 | Shavit | G06F 9/466 711/163 |
| 2009/0276431 | A1* | 11/2009 | Lind | G06F 9/466 |
| 2010/0146243 | A1* | 6/2010 | Balko | G06Q 10/06 712/33 |
| 2011/0138135 | A1* | 6/2011 | Dice | G06F 12/00 711/152 |
| 2011/0145699 | A1* | 6/2011 | Kheiri | G06F 8/73 715/236 |
| 2012/0311609 | A1* | 12/2012 | Taylor | G06F 8/20 719/313 |
| 2012/0324472 | A1* | 12/2012 | Rossbach | G06F 9/467 718/106 |
| 2013/0212568 | A1* | 8/2013 | Huang | G06F 8/458 717/146 |
| 2013/0275360 | A1* | 10/2013 | Kharod | G06F 17/30563 707/602 |
| 2014/0298325 | A1* | 10/2014 | Husar | G06F 9/54 718/1 |
| 2015/0089068 | A1* | 3/2015 | Islam | H04L 47/741 709/226 |
| 2016/0110261 | A1* | 4/2016 | Parab | G06F 11/1453 707/692 |

OTHER PUBLICATIONS

Ozalp Babaoglu, Alberto Batoli, Vance Maverick, Alberto Montresor, Davide Rossi, Jaksa Vuckovic, Middleware Technologies for Adaptive and Composable Distributed Components, 1998-2002, 13 pages, retrieved from http://sites.googe.com/site/jaksa76/JBossClusteringAnalysis.doc on Oct. 1, 2014.

Huaigu Wu; Bettina Kemme, Fault-tolerance for Stateful Application Servers in the Presence of Advanced Transactions Patterns, 11 pages, School of Computer Science, McGill University, Montreal, Quebec, Canada, H3A 2A7 retrieved from http://www.cs.mcgill.ca/~kemme/papers/srds05.pdf on Oct. 1, 2014.

Sacha Labourey, Bill Burke, J Boss, JBoss as Clustering, May 21, 2004, 11 pages, retrieved from http://docs.jboss.com/jbossas/clustering/JBossClustering7.pdf on Oct. 1, 2014.

Salil Deshpande, Clustering: Transparent Replication, Load Balancing, and Failover, Jan. 2000, 22 pages, Technology Tower, Suite 1000, 191 Coronado Ave; San Carlos CA 94070-2805, retrieved from http://dn.embarcadero.com/article/images/26438/11501_r1.pdf on Oct. 1, 2014.

* cited by examiner

EXECUTION OF A METHOD AT A CLUSTER OF NODES

TECHNICAL FIELD

The present disclosure generally relates to a cluster of nodes, and more particularly to executing a method at each node in the cluster.

BACKGROUND

An application server may be an environment in which an application runs. Clustering application servers together may provide workload management and failover for applications that reside in the cluster. It may be difficult to execute the same code (e.g., methods) with the same parameters on all of the application servers in the cluster simultaneously in particular circumstances. In an example, if the application is written in the Java programming language, the application may include stateful, stateless, or Singleton enterprise Java beans (EJBs). An application typically includes at most one instance of the Singleton EJB. The Singleton EJB may be useful to, for example, keep count of the number of accesses to the application or to ensure that the number of exits from the whole application is one. In a clustered environment, however, the Singleton EJB can exist in multiple instances, which makes the Singleton EJB unusable in such environments.

BRIEF SUMMARY

Methods, systems, and techniques for executing a clustered method at a cluster of nodes are provided.

According to an embodiment, a method of executing a clustered method at a cluster of nodes includes identifying an annotated class included in an application that is deployed on the cluster of nodes. An annotation of the class indicates that a clustered method associated with the annotated class is executed at each node in the cluster. The method also includes creating an instance of the annotated class. The method further includes coordinating execution of the clustered method with one or more other nodes in the cluster. The method also includes executing, based on the coordinating, the clustered method using the respective node's instance of the annotated class.

According to another embodiment, a system for executing a clustered method at a cluster of nodes includes a first node and a second node in the cluster of nodes. An application is deployed on the cluster of nodes. The first node identifies an annotated class included in the application, creates a first instance of the annotated class, coordinates execution of the clustered method with the second node, and executes, based on the coordinating, the clustered method using the first instance of the annotated class. An annotation of the class indicates that a clustered method associated with the annotated class is executed at each node in the cluster. The second node identifies the annotated class included in the application, creates a second instance of the annotated class, and executes, based on the coordinating, the clustered method using the second instance of the annotated class.

According to another embodiment, a non-transitory machine-readable medium includes a plurality of machine-readable instructions that when executed by one or more processors are adapted to cause the one or more processors to perform a method including: at each node in a cluster of nodes: identifying an annotated class included in an application that is deployed on the cluster of nodes, an annotation of the class indicating that a clustered method associated with the annotated class is executed at each node in the cluster; creating an instance of the annotated class; coordinating execution of the clustered method with one or more other nodes in the cluster; and executing, based on the coordinating, the clustered method using the respective node's instance of the annotated class.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architectures
  A. Clustered Classes and Clustered Methods
  B. Shared Variables
    1. Primitive Type
    2. Collection Type
  C. Return Type
    1. Collection of Returned Data Types
    2. Return Type of Clustered Method
  D. Other Annotations
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to execute a clustered method at each node in a cluster of nodes. An application may be deployed on a cluster of nodes, and the application may include a clustered class and a clustered method. A clustered class is a class that is deployed on the cluster and is instantiated at each node in the cluster. A clustered method is a method that is associated with the clustered class and is executed at each node in the cluster. It may be advantageous to execute a method at each node in the cluster in order to, for example, provider higher performance or to complete a task on the cluster of nodes (e.g., routine management task, data preparation, or file re-organization) because of their different geo-locations. The nodes may coordinate with each to execute the clustered method, as further discussed below.

Unless specifically stated otherwise, as apparent from the following discussion, it is appreciated that throughout the description, discussions utilizing terms such as "identifying", "creating", "coordinating", "executing", "receiving", "sending", and "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architectures

Figure 1:
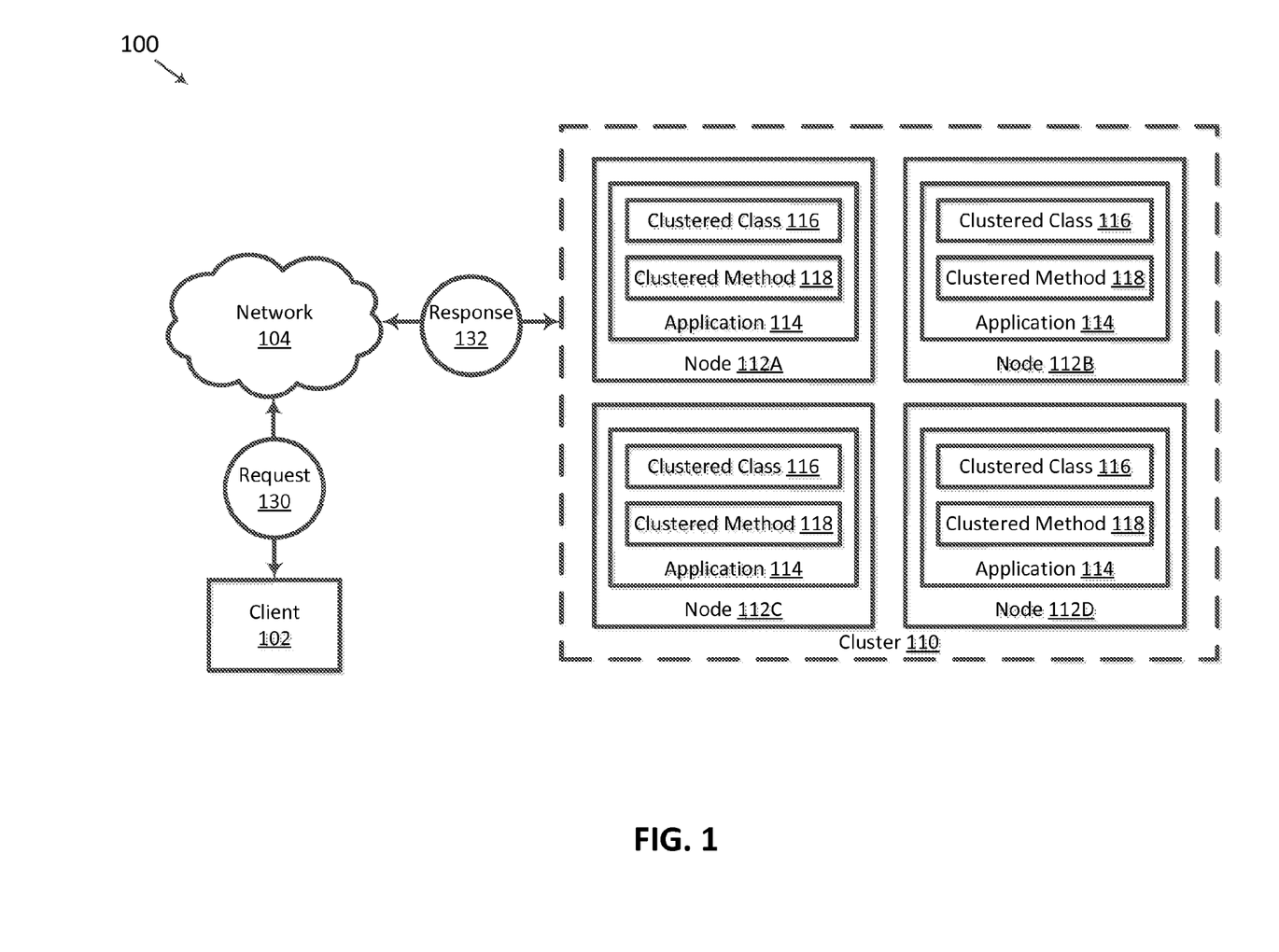
FIG. 1 is a simplified block diagram illustrating a system for executing a clustered method at a cluster of nodes, according to some embodiments.

FIG. 1 is a simplified block diagram 100 illustrating a system for executing a clustered method at a cluster of nodes, according to some embodiments. FIG. 1 includes a client 102 and a cluster of nodes 110 coupled over a network 104. Network 104 may be, for example, a private network (e.g local area network (LAN), wide area network (WAN), intranet, etc.), a public network (e.g., the Internet), or a combination thereof. The network may include various configurations and use various protocols including the Internet, World Wide Web, intranets, virtual private networks, WANs, LANs, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 102 may be a personal computer (PC), workstation, mobile device (e.g., a mobile phone, personal digital assistant (PDA), tablet, and laptop), game console, set-top box, kiosk, embedded system, or other device having at least one processor and memory. Client 102 may also be an application run on a PC, server, database, etc. Additionally, client 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

Cluster 110 includes a plurality of nodes that communicate with each other and work towards a common goal. In FIG. 1, cluster 110 includes node 112A, node 112B, node 112C, and node 112D. Each node may be an application server instance (e.g., enterprise application server instance) that executes on a computing device having at least one processor and memory. In an example, cluster 110 is a JBoss Application Server cluster (also known as a "partition"), and a node in the cluster is a JBoss Application Server instance. Nodes in cluster 110 may be located in the same physical machine or different physical machines.

A node may run an application 114 that is written in a high-level programming language. In an example, application 114 is written in an object-oriented programming language that defines classes (e.g., JAVA® or C++). In some high-level programming languages, a class may serve as a center point for application logic. Trademarks are the properties of their respective owners. An object may be a self-contained entity that has state and behavior and represents an instance of a class. An instance's state may be described as its fields and properties, and the instance's behavior may be described by its methods. Application 114 may include code that creates an object, which is an instance of a class, and the instance of a particular class may expose methods and properties defined by that class.

The nodes in cluster 110 may appear to end users and applications as if they are on one single physical server. The combined processing power of the multiple nodes in cluster 110 can provide greater throughput and scalability than is available compared to the processing power from a single node. The nodes in cluster 110 may communicate in a peer-to-peer manner and may be self-organized. Communication between the nodes may be handled by a group communication library, with a network channel providing the core functionality of tracking who is in the cluster and reliably exchanging messages between the cluster members. Each node in cluster 110 is aware of the other nodes in cluster 110 and has their information. The channels with the same configuration and name have the ability to dynamically discover each other and form a group. Nodes may be dynamically added to or removed from cluster 110 at any time by, for example, starting or stopping a channel with a configuration and name that matches the other cluster members.

A node is an environment in which an application may run. Application 114 may be deployed on cluster 110. In an example, when application 114 is deployed on node 112A, application 114 may be scaled and automatically copied over and deployed on each of the other nodes in cluster 110 (e.g., node 112B, node 112C, and node 112D). Application scaling may be used for higher throughput or higher performance for the application as a whole.

A. Clustered Classes and Clustered Methods

Application 114 includes one or more clustered classes 116 and one or more clustered methods 118. A clustered class is a class that is deployed on cluster 110 and is instantiated at each node in the cluster. In some cases, the application may be deployed on cluster 110 but the clustered class is unintentionally not deployed. For example, if an error occurs on the server side (e.g., running out of disk space), the node running out of space may determine that it does not have enough memory to deploy the clustered class. A clustered method is a method that is associated with the clustered class and is executed at each node in the cluster. It may be advantageous to execute a method at each node in cluster 110 in order to, for example, provider higher performance or to complete a task on the cluster of nodes (e.g., routine management task, data preparation, or file re-organization) because of their different geo-locations.

Client 102 may send a request 130 to node 112A, where request 130 includes a request to invoke clustered method 118. Client 102 may be, for example, an application deployed on a node in the cluster or an external application in communication with the node. In response to receiving request 130, the nodes in cluster 110 may invoke the clustered method and one or more nodes in the cluster may send a response 132 to client 102. In an example, node 112A may receive request 130 and coordinate with nodes 112B, 112C, and 112D such that each node creates an instance of clustered class 116 and invokes clustered method 118 on the respective node's instance.

A node may identify a class included in application 114 as a clustered class by, for example, an annotation that annotates the class. An example annotation is provided in Table A.

TABLE A

| | |
|---|---|
| @Clustered | // example annotation (line 1) |
| public class ClusteredService { | // example annotated class (line 2) |
| //methods} | |

The example code in Table A may be included in application 114. At line 1 of Table A, an example annotation "@Clustered" annotates the class "ClusteredService," which is declared at line 2 of Table A and may include one or more clustered methods. The "@Clustered" annotation serves as a label to indicate that the annotated class is a clustered class and further that a clustered method associated with the annotated class is executed at each node in the cluster. In an example, application 114 is a JAVA application, and clustered class 116 is a type of Enterprise JAVA bean (EJB). In this example, clustered class 116 may be based on the Stateful EJB.

When application 114 is deployed on cluster 110, each of the nodes in cluster 110 may search application 114 for annotations. For example, each node in cluster 110 may run through the classes in the application and search for annotations that are known to the node. The annotation may provide information to the node about the life cycle of the class, and the node may maintain the life cycle of the class based on the annotation. Referring to Table A, any class that is annotated with "@Clustered" may be identified as a clustered class and indicate to a node that a clustered method associated with the annotated class is executed at each node in the cluster. Each of the nodes in cluster 110 may create an instance of clustered class 116 and coordinate execution of the clustered method associated with the clustered class with one or more other nodes in cluster 110.

For brevity and simplicity, the following is a description of node 112A and actions that it may perform. This description applies as well to other nodes in cluster 110 (e.g., nodes 112B, 112C, and 112D). In an example, node 112A is a sender node that identifies clustered class 116 as being a clustered class, and sends a message to one or more recipient nodes in cluster 110, where the message indicates that node 112A has found clustered class 116 and asks whether the recipient node has also found clustered class 116. If a recipient node has found clustered class 116, the recipient node may send a confirmation to node 112A that clustered class 116 has been found.

After node 112A receives the confirmation from each of the nodes in cluster 110, the nodes in cluster 110 may connect together and synchronize the execution of the clustered method. Each of the nodes in cluster 110 may execute, based on the coordinating, clustered method 118 using the respective node's instance of the annotated class. In an example, the clustered method may be executed on a node in cluster 110 within a threshold period of time from which one or more of the other nodes in the cluster executes the clustered method. The threshold period of time may vary. In an example, the threshold period of time is 0 milliseconds (ms) or greater (e.g., 1 ms, 2 ms, 3 ms, or greater).

B. Shared Variables

Figure 2:
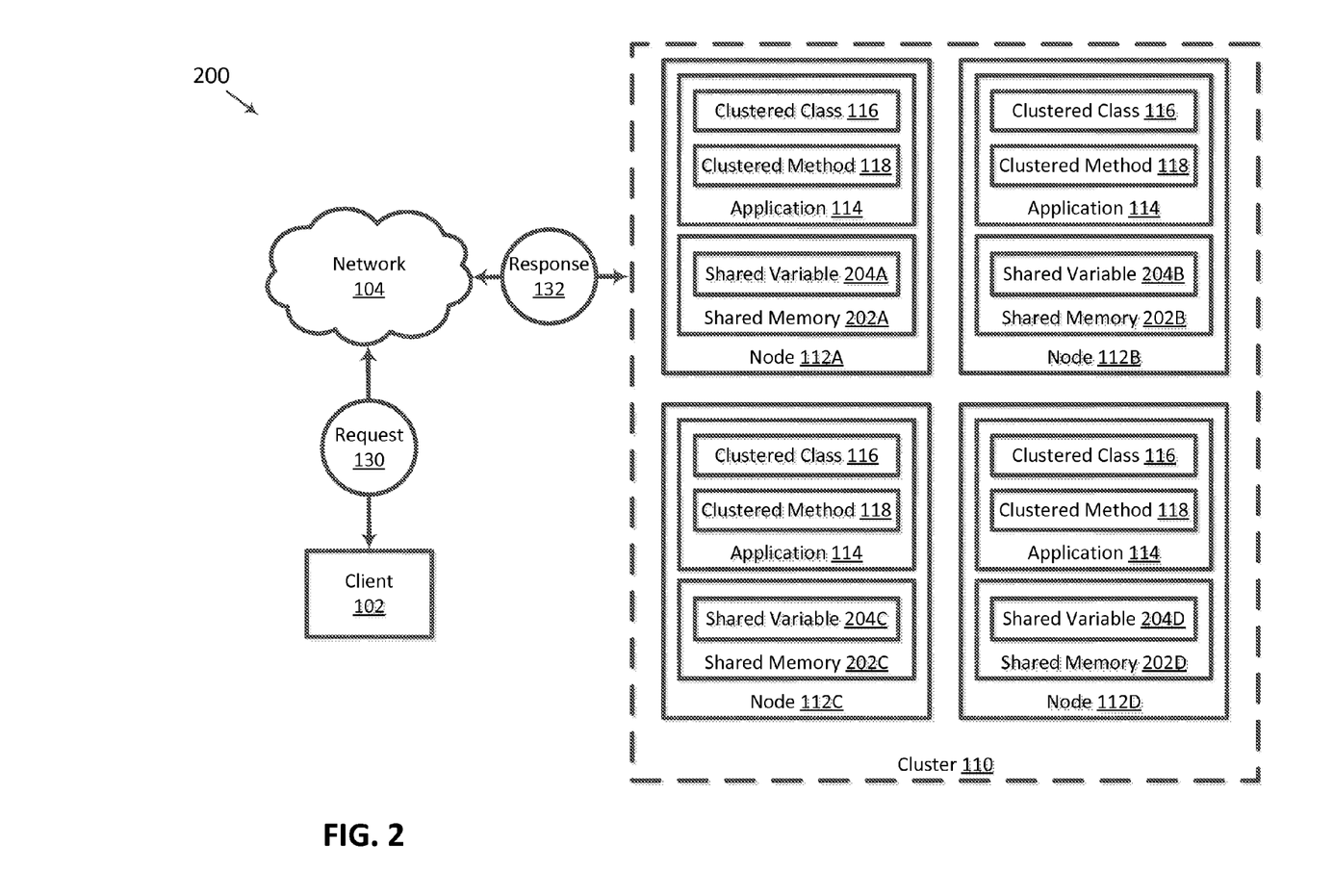
FIG. 2 is a simplified block diagram illustrating a system for executing a clustered method associated with a shared variable, according to some embodiments.

In some embodiments, a shared variable may be used to synchronize work that is performed by the nodes in cluster 110. In an example, application 114 includes a data type that enables the nodes in cluster 110 to synchronize their work between them using the shared variable. FIG. 2 is a simplified block diagram 200 illustrating a system for executing a clustered method associated with a shared variable, according to some embodiments. FIG. 2 illustrates client 102 coupled to cluster 110 over network 104. In FIG. 2, cluster 110 includes nodes 112A, 112B, 112C, and 112D, and each of the nodes in cluster 110 includes a shared memory, and a shared variable that is stored in the shared memory.

In FIG. 2, node 112A includes a shared variable 204A that is stored in a shared memory 202A, node 112B includes a shared variable 204B that is stored in a shared memory 202B, node 112C includes a shared variable 204C that is stored in a shared memory 202C, and node 112D includes a shared variable 204D that is stored in a shared memory 202D. Access to a node's shared variable may be shared among the other nodes in cluster 110 via the node's shared memory. For example, access to node 112A's shared variable 204A may be shared with nodes 112B, 112C, and 112D such that these nodes may read the value of node 112A's shared variable 204 stored in shared memory 202A. Although the shared memory of the nodes in cluster 110 is illustrated as including one shared variable, it should be understood that the shared memory may store more than one shared variable.

The nodes may each store a version of the shared variable and use it to synchronize work. Each of the nodes has a version of the shared variable that may or may not have the same value at a point in time. A data type of the shared variable may be of a primitive data type (e.g., integer, string, character, etc.) or be a collection of data types (e.g., array, hashmap, or list). An example data type that enables the nodes in cluster 110 to synchronize their work between them is provided in Table B below.

TABLE B

| | |
|---|---|
| public class Clustered <T extends Serializable> { | // line 1 |
|     protected T initialValue ( ); | |
|     protected T get ( ); | |
|     protected T void set (T value); | |
|     protected T void lock ( ); | // line 5 |
|     protected T void unlock ( ); } | |

The example code in Table B may be included in application 114. In the example illustrated in Table B, a type definition of the shared variable is defined as including a get( ) method that retrieves the value of the shared variable and a set ( ) method that updates a value of the shared variable, where at most one node updates the value of the shared variable at a time. The get( ) and set ( ) methods may be atomic operations. Additionally, the type definition of the shared variable is defined as including a lock ( ) method that locks access to the shared variable and an unlock ( ) method that unlocks access to the shared variable, where at most one node locks access to the shared variable at a time.

At line 1 of Table B, a data type "Clustered" is declared and may provide an instance of the "Clustered" class with access to a variable that is shared among the nodes in cluster 110. The "Clustered" class may be a type definition that is used for the shared variable. In an example, the "Clustered" class provides an instance of clustered class 116, which is deployed on each of the nodes in cluster 110, with access to a variable that is shared among the nodes in cluster 110. Nodes in cluster 110 may have access to the same data by each creating an instance of the "Clustered" class and invoking methods on the respective node's instance of the "Clustered" class. The variable "T" represents a type variable, and the "Clustered" class may be instantiated using different data types by replacing the variable "T" with the desired data type (e.g., integer, string, array, etc.).

The "Clustered" class includes five methods. At line 2 of Table B, the "protected T initialValue ( )" method may assign a value to the shared variable. The developer of application 114 may expect the user to override this method (e.g., via a constructor) and thus implement the "protected T initialValue ( )" method such that it returns the initial value of the variable. At line 3 of Table B, the "protected T get ( )" method returns the value of the shared variable. At line 4 of Table B, the "protected T void set (T value)" method sets the value of the shared variable according to the input parameter value. At most one node in cluster 110 may set the value of the shared variable at a time. In an example, if node 112A invokes the "protected T void set (T value)" method on an instance of the "Clustered" class, the other nodes in cluster 110 are blocked from invoking this method on their instances of the "Clustered" class until node 112A's call to this method is finished. Each of the nodes in cluster 110 may synchronize with each other to ensure that at most one node in cluster 110 is setting the value of the shared variable at a time.

At line 5 of Table B, the "public void lock ( )" method locks access to the shared variable, where at most one node locks access to the shared variable at a time. At line 6 of Table B, the "public void unlock ( )" method unlocks access to the shared variable. If the use of a shared variable is more complicated than a single change, the lock ( ) and unlock ( ) methods may be used rather than the set ( ) method. The lock ( ) method allows access to the shared variable to be locked for a longer period of time compared to the set ( ) method. For example, the lock ( ) method may lock access to the shared variable for multiple operations at the same time. Any node in cluster 110 that attempts to access the shared variable during execution of these multiple operations is blocked until the unlock ( ) method is called by the node that has the lock to the shared variable. After the unlock ( ) method is called, another node (e.g., the same node that previously locked access to the shared variable or one of the other nodes in cluster 110) may invoke the lock ( ) method to access the shared variable and block other nodes from accessing the shared variable. The lock ( ) and unlock ( ) methods may be used as a synchronization block in cluster 110 and may be thought of as a cluster-wide synchronization keyword.

1. Primitive Type

Table C provides an example use case of the "@Clustered" annotation (in Table A) and the "Clustered" data type (in Table B) being used for a shared variable.

TABLE C

| | |
|---|---|
| @Clustered | // line 1 |
| public class ClusterCounter { | |
|   private Clustered<Integer> counter = new Clustered <>{ }{ | |
|     @Override protected Integer initialValue ( ) { | |
|       return new Integer (0);} | // line 5 |
|   @PostConstruct | |
|     public void onLoad ( ) { | |
|       counter.lock ( ); | |
|       counter.set (counter.get( ) + 1); | |
|       counter.unlock ( ); } | // line 10 |
|   public int getNodesCount ( ) { | |
|     return counter.get ( ); // no lock needed}} | |

The example code in Table C may be included in application 114. At line 1 of Table C, an example annotation "@Clustered" annotates the class "ClusterCounter," which is declared at line 2 of Table B and may include one or more clustered methods. The "ClusterCounter" class is annotated with the annotation "@Clustered," which indicates that the "ClusterCounter" class is a clustered class. In the example illustrated in Table C, the "ClusterCounter" class includes a variable that is shared among the cluster of nodes, and access to the shared variable is synchronized across the cluster of nodes. At line 3 of Table C, the shared variable "counter" is declared and is defined by the Clustered data type definition (in Table B). The variable "counter" is of an integer type and is shared among the nodes in cluster 110. At lines 4 and 5 of Table C, the "protected Integer initialValue( )" method is annotated with an annotation "@Override", which indicates to the node to override the user's use of the annotated method (if overridden) and to return the initial value of the "counter" variable.

At line 6 of Table C, an example annotation "@PostConstruct" annotates the method "onLoad," where the "@PostConstruct" annotation indicates to a node that the annotated method is a clustered method and is to be executed upon creation of an instance of the clustered class associated with the clustered method. In some embodiments, an annotation or constructor may be used to initialize the clustered method. The "@PostConstruct" annotation may be used to initialize the class and may be desirable to use if application 114 is written in an object-oriented programming language in which a property of the classes allows users to override the methods. In an example, the "@PostConstruct" annotation may be referred to as a callback method that is executed upon class creation. At line 7 of Table C, a clustered method "onLoad" is declared. The nodes in cluster 110 may coordinate execution of the "onLoad" clustered method and execute, based on coordinating with each other, the clustered method within a threshold period of time from which one or more of the other nodes in the cluster execute the clustered method. In an example, the nodes in cluster 110 execute the clustered method at the exact same time or approximately the same time (e.g., within ms to seconds of each other).

Each of the nodes in cluster 110 may search through application 114 for clustered classes that are annotated with the annotation "@Clustered" to identify a clustered class, create an instance of the clustered class, search for the clustered method (e.g., the method annotated with "@PostConstruct") associated with the "ClusterCounter" clustered class, and initiate execution of the clustered method. In Table C, the clustered method is the OnLoad ( ) method, and a node executes this clustered method by using the respective node's instance of the clustered class (e.g. counter). Additionally, in Table C the clustered class includes the shared variable and does not include the clustered method.

The "onLoad" method has three method calls. At lines 8-10 of Table C, the lock ( ) method is invoked on an instance of the "ClusterCounter" clustered class (e.g., counter.lock( )), the set ( ) method is invoked on an instance of the "ClusterCounter" clustered class (e.g., counter.set(counter.get( )+1)), and the unlock ( ) method is invoked on an instance of the "ClusterCounter" clustered class (e.g., counter.unlock( )), respectively. As each of the nodes in cluster 110 separately initiates execution of the "onLoad" clustered method, at most one of the nodes in cluster 110 may lock access to the shared variable "counter." Accordingly, at most one of the nodes in cluster 110 may continue the execution of the clustered method after the call to the lock ( ) method in the "onLoad" clustered method.

The nodes in cluster 110 may coordinate execution of the clustered method "onLoad" with each other. In an example, node 112A wants to lock the shared variable and sends a lock request with a timestamp to the other nodes in cluster 110, where the lock request indicates that node 112A would like to lock access to the shared variable. Before node 112A receives approval from the other nodes in cluster 110 to lock access to the shared variable, node 112A may also receive a lock request from zero or more of nodes 112B, 112C, and/or 112D. The node that sends the message with the oldest timestamp receives approval to lock access to the shared variable and continues execution of the onLoad method ( ). For example, the node that locks access to the shared variable may invoke the set ( ) method on the node's instance of the counter object.

In the set ( ) method, the value of the shared variable is obtained (e.g., counter.get( )), incremented by 1, and then its value is set or updated to the incremented value. The other nodes in cluster 110 may update their versions of the shared variable to reflect the most updated value of the shared variable. In an example, the synchronization of the shared variable among the nodes in cluster 110 is done via an update message to one or more of the other nodes in cluster 110. In this example, the update node that updates the shared variable's value may send an update message to the other nodes in cluster 110, where the update message indicates that the value of the shared variable has been updated. The other nodes may receive the update message, update their versions of the shared variable, and send a confirmation of the change to the update node.

In another example, the synchronization of the shared variable among the nodes in cluster 110 is done via a database. In this example, the update node that updates the shared variable's value may store the updated value of the shared variable in a database, and nodes in cluster 110 may monitor the database for updates to the shared variable. In response to recognizing that its shared variable does not reflect the most up-to-date value, a node may update its version of the shared variable. Alternatively, the update node may store the updated value of the shared variable in a database and send an update message to one or more of the nodes in cluster 110, where the update message indicates that the value of the shared variable has been updated. The other nodes may receive the update message, read the updated value of the shared variable from the database, update their versions of the shared variable to reflect the updated value, and send a confirmation of the change to the update node.

After the update node receives the confirmation of change from each of the other nodes in cluster 110, the update node may invoke the unlock ( ) method on the update node's instance of the clustered class. Another node may then gain access to the shared variable and block the other nodes from gaining access to the shared variable. In an example, the node with the next to the oldest timestamp may receive approval to lock access to the shared variable and continues execution of the onLoad method ( ). In another example, one or more nodes in cluster 110 may again send a lock message with a timestamp to the other nodes in cluster 110, and the node that sends the message with the oldest timestamp in this round receives approval to lock access to the shared variable and continues execution of the onLoad method( ). Thus, each of the nodes in cluster 110 may execute the code in the clustered method in a serial manner and update the shared variable one at a time. At lines 11-12 of Table C, a getNodesCount ( ) method is declared and returns the integer value of the shared variable "counter." No lock is needed for the get ( ) method.

To reduce the data that is passed between the nodes, a node may update the shared variable and not immediately indicate to the other nodes in cluster 110 that the node has updated the shared variable's value. In an example, the node that updated the shared variable may wait to receive a request to lock the shared variable from another node and in response to the request, send an indication to the nodes in cluster 110 that the value of the shared variable has been updated. The node may also wait until the load in cluster 110 is below a threshold load and then send an indication to the nodes in cluster 110 that the value of the shared variable has been updated. Accordingly, the node may reduce the load on the cluster 110 during high-peak periods.

2. Collection Type

In the example illustrated in Table C, the shared variable is of a primitive type (e.g., integer) but this is not intended to be limiting. In another example, the shared variable is of a collection of data types shared between the nodes in cluster 110. In this example, the data type of the shared variable may be a shared collection of variables that stores multiple values, and each of the nodes in cluster 110 may have access to the shared collection of variables. In an example, the shared collection is a hashmap, array, or list.

The shared collection of variables may be divided into a plurality of portions, where each portion is assigned to a node for processing by the node. In an example, node 112A may be assigned a different portion of the shared collection than nodes 112B, node 112C, and/or node 112D. One or more of the nodes in cluster 110 may coordinate an assignment of a portion of the shared collection of variables with one or more other nodes in the cluster. In some embodiments, a node may divide the shared collection of variables into portions and assign each portion to one or more nodes. For example, if the shared collection of variables is an array of 16 numbers, node 112A may divide the array into four portions, each portion being four consecutive slots in the array. In this example, node 112A may be assigned the first portion having four slots (e.g., array[0]-array[3]), node 112B may be assigned the second portion having four slots (e.g., array[4]-array[7]), node 112C may be assigned the third portion having four slots (e.g., array[8]-array[11]), and node 112D may be assigned the fourth portion having four slots (e.g., array[12]-array[15]). In this example, the instantiation of an instance of the shared variable using the "Clustered" clustered class may be "private Clustered<Array>array=new Clustered < >{ }." In another example, the shared collection may be a hashmap, and node 112A may invoke a method (e.g., public KeySet <K>getKeyPortion ( )) that returns a set of hashmap keys to which particular nodes are assigned. Node 112A may ensure that each of the nodes is assigned a different key set and that each key is distributed between the nodes.

In some embodiments, the nodes may negotiate with each other to determine which node is assigned to which portions of the shared collection of variables. In an example, the nodes negotiate with each other such that node 112A is assigned the first portion having four slots (e.g., array[0]-array[3]), node 112B is assigned the second portion having four slots (e.g., array[4]-array[7]), node 112C is assigned the third portion having four slots (e.g., array[8]-array[11]), and node 112D is assigned the fourth portion having four slots (e.g., array[12]-array[15]).

Each of the nodes may access their assigned portions of the shared collection quickly, and each of the nodes may update one or more variables in its respectively assigned portion. When a node executes the clustered method using the node's instance of the clustered class, the node may update one or more variables of the node's assigned portion of the collection. In an example, the shared collection may be a list of 100 values, and the nodes may implement a sorting algorithm and sort the values in the list. The clustered class associated with the shared collection of variables may be deployed on nodes 112A, 112B, 112C, and 112D, which use the list as a shared list that is accessible to all the nodes in cluster 110. Each of the nodes may be assigned 25 items in the list to sort and may sort their assigned items.

It may be unnecessary for the nodes to synchronize their changes to the shared collection across all the nodes in cluster 110. Rather, for high performance and to avoid unnecessarily synchronizing data in the shared collection, the nodes may synchronize their data at the end (e.g., after each of the nodes has finished updating its portion of the shared collection) or when a node uses a value that is stored in a portion of the shared collection not assigned to the node (e.g., when the node reads from or writes to a portion that is assigned to another node). Synchronizing data may be an expensive operation. Accordingly, higher performance may be achieved because it may be unnecessary for the data to be synchronized between the nodes whenever a value in the collection has changed. In an example, application 114 is a JAVA application. In this example, if clustered class 116 does not include a shared variable, then clustered class 116 behaves similar to a Stateless EJB because it is unnecessary to synchronize data between the clustered class deployed on the nodes. Synchronization is triggered by accessing the variables in the class that are either of the clustered class type or any other special collection type.

C. Return Type

A clustered method may have a return type (e.g., void, int, string, etc.). Although the same code in the clustered method is executed at each node in cluster 110, an output of the clustered method executed at node 112A may return a different value from an output of the clustered method executed at node 112B because the clustered methods run in different environments. For example, an output of the clustered method may be based on the time the clustered method is executed at the node, or may read a configuration file that is different on the nodes in cluster 110. As such, if the same method is executed at each of the nodes in cluster 110, various values of the same return type may be returned by the nodes.

Client 102 may send request 130 to cluster 110, where request 130 includes a request to invoke clustered method 118. In an example, client 102 sends request 130 to a node in cluster 110, and one or more nodes in cluster 110 may then communicate with each other to propagate the request, collect the output values of the method call invoked at each node from the respective node, and return one or more output values to the client. In response to the propagated request or method call, each node in cluster 110 may identify clustered class 116 and clustered method 118, which is associated with clustered class 116. The respective nodes may identify an annotation of clustered method 118 indicating a return type of the request and that is based on request 130 and returned to client 102. One or more nodes may send in accordance with the return type one or more outputs of the clustered method executed at the respective node to the client. In some embodiments, a node may identify an annotated clustered method, where an annotation of the clustered method indicates an interface having a particular return type that is returned to client 102.

1. Collection of Returned Data Types

In an example, the return type indicated by the annotation of clustered method 118 is a collection of variables. In this example, client 102 receives the collection of variables including outputs of the clustered method executed at each of the nodes in the cluster. Example code that includes an annotation of a clustered method indicating that the return type is a collection of variables is provided in Table D.

TABLE D

| | |
|---|---|
| @Clustered | // line 1 |
| public class WeatherService { | |
|   @ReturnAll | |
|   public Integer getWindDirection ( ) {...}} | |
| @Resource | // line 6 |
| WeatherService ws; | |
| List<Integer> returnValues = ws.getWindDirection( ); | |

The example code in Table D may be included in application 114. Lines 1-4 of the example code in Table D may be executed by each of the nodes in cluster 110. At line 1 of Table D, an example annotation "@Clustered" annotates the class "WeatherService," which is declared at line 2 of Table D and may include one or more cluster methods. The "WeatherService" class is annotated with the annotation "@Clustered," which indicates that the "WeatherService" class is a clustered class.

At lines 3-4 of Table D, an example annotation "@ReturnAll" annotates the "getWindDirection ( )" method, which is a clustered method. The "WeatherService" clustered class includes the "getWindDirection ( )" clustered method. The "@ReturnAll" annotation indicates that all of the values returned from the nodes in cluster 110 are of interest to the client. The clustered method "getWindDirection ( )" is declared at line 4 of Table D, is included in the "WeatherService" clustered class, and returns an integer value. In such an example, when a node executes the "getWindDirection ( )" clustered method the node invokes the "getWindDirection ( )" clustered method on the respective node's instance of the "WeatherService" clustered class and returns an integer value for the wind direction.

Lines 6-9 of the example code in Table D may be executed by client 102, which desires to use the services offered by application 114 or by the clustered class. At line 6 of Table D, example annotation "@Resource" annotates the instantiation of the "WeatherService" clustered class, which is instantiated at line 7 of Table D. The "ws" object is an instance of the "WeatherService" clustered class and is created at each of the nodes in cluster 110. At line 9 of Table D, the "getWindDirection ( )" clustered method is invoked on the instance of the "WeatherService" clustered class, and each of the nodes may have an output based on executing the "getWindDirection ( )" clustered method at the respective node. In response to client 102 sending a request to a node in cluster 110, where the request causes the "getWindDirection ( )" method to be invoked, one or more nodes in cluster 110 may then communicate with each other to propagate the request, collect the outputs of the method invocation, and return them to client 102.

Rather than return the declared type of the "getWindDirection ( )" clustered method (integer), cluster 110 returns a collection of the declared type (collection of integers) to the client 102, where the collection includes all of the output values from executing the clustered method at the nodes in cluster 110. In an example, node 112A may return a first wind direction, node 112B may return a second wind direction, node 112C may return a third wind direction, and node 112D may return a fourth wind direction, where the first, second, third, and/or fourth wind directions are all returned to client 102 and may be the same or different from each other. Client 102 may then decide how to handle the four wind direction outputs that are received from cluster 110, where the four wind direction outputs may be stored in the "returnValues" list of integers.

2. Return Type of Clustered Method

In another example, the return type indicated by the annotation of clustered method 118 is the same return type as the clustered method. In this example, client 102 receives one variable of the return type, where the returned value includes one output of the clustered method executed at one of the nodes in the cluster. The returned value may be selected from the multiple output values produced from executing the clustered method at the nodes in cluster 110.

Example code that includes an annotation of a clustered method indicating that the return type is the same as the return type of the clustered method is provided in Table E.

TABLE E

```
@Clustered                                              // line 1
public class WeatherService {
    @ReturnByzantine
    public Integer getWindDirection ( ) {...}}
@Resource                                               // line 6
WeatherService ws;
try { Integer windDirection = ws.getWindDirection ( ); }
catch (ByzantineNegotiationException bne) {...}         // line 10
```

The example code in Table E may be included in application 114. Lines 1-4 of the example code in Table E may be executed by each of the nodes in cluster 110. At line 1 of Table E, an example annotation "@Clustered" annotates the class "WeatherService," which is declared at line 2 of Table E and may include one or more clustered methods. The "WeatherService" class is annotated with the annotation "@Clustered," which indicates that the "WeatherService" class is a clustered class.

At lines 3-4 of Table E, an example annotation "@ReturnByzantine" annotates the "getWindDirection ( )" method, which is a clustered method. The "WeatherService" clustered class includes the "getWindDirection ( )" clustered method. The "@ReturnByzantine" annotation indicates that only one of the values returned from the cluster 110 are of interest to the client. A node may negotiate the return value based on a routine, as is discussed further below, and may be fault tolerant based on the node's configuration. The clustered method "getWindDirection ( )" is declared at line 4 of Table E and returns an integer value. In such an example, when a node executes the "getWindDirection ( )" clustered method the node invokes "getWindDirection ( )" on the respective node's instance of the "WeatherService" clustered class.

Lines 6-10 of the example code in Table E may be executed by client 102, which desires to use the services offered by application 114 or by the clustered class. At line 6 of Table E, example annotation "@Resource" annotates the instantiation of the "WeatherService" clustered class, which is instantiated at line 7 of Table D. The "ws" object is an instance of the "WeatherService" clustered class and is created at each of the nodes in cluster 110. At lines 9-10 of Table E, an exception may be thrown from a call to the "getWindDirection ( )" method. The exception may be thrown if the nodes do not come to an agreement on which value to return to client 102. The exception may be a runtime exception that cancels any possible transaction in which the method was executed.

One or more deciding nodes in cluster 110 may handle multiple output values produced from executing the clustered method at the nodes in cluster 110, select a single value from the multiple outputs based on a negotiation to return to client 102 as the output, and return the single value to client 102. In an example, a single deciding node may be the same node to which client 102 sent request 130 and/or may also be the same node that returns the result to client 102. The deciding node may propagate the request to invoke the clustered method, collect the outputs of the method invocation from the nodes in cluster 110, select one of the outputs, and return the selected output to client 102. In another example, the deciding node may be a different node to which client 102 sent request 130 and/or may be a different node from the node that returns the result to client 102.

The deciding node may use various routines such as the Byzantine negotiation routine, etc. In an example of the Byzantine negotiation routine, if the same value is returned by at least 50% of the nodes, the deciding node may determine that the correct output is that particular value. In this example, client 102 receives only one output value out of all of the multiple output values produced from executing the clustered method at the nodes in cluster 110. In an example, node 112A may return a first wind direction, node 112B may return a second wind direction, node 112C may return a third wind direction, and node 112D may return a fourth wind direction, where only one of the first, second, third, and fourth wind directions is returned to client 102. The first, second, third, and fourth wind directions may be the same or different from each other.

D. Other Annotations

A clustered class or its associated clustered method may be annotated with annotations different from those described above. In some embodiments, a clustered class or its associated clustered method may be annotated with a transaction annotation indicating that execution of the clustered method at each node in the cluster is part of a transaction. In an example, a clustered method may be annotated with a transaction annotation indicating one or more transactions specified on the clustered method associated with the clustered class. The clustered method may be executed at each of the nodes within a new transaction, and all of the clustered method invocations on a node's instance of a class may be part of the transaction. One or more transaction attributes may be specified on the clustered method. Each node in cluster 110 may commit the transaction when each node successfully executes the clustered method, and each node in cluster 110 may roll back the transaction when at least one node in the cluster fails to successfully execute the clustered method. If a node fails during the invocation of the clustered method, the transaction may be canceled.

In some embodiments, a clustered class or its associated clustered method may be annotated with an annotation indicating one or more security constraints specified on the clustered method. In an example, when a node identifies the security annotation, the credentials on the node may be verified separately.

As discussed above and further emphasized here, FIGS. 1 and 2 are merely examples, which should not unduly limit the scope of the claims. For example, although one client and four nodes in cluster 110 are illustrated in FIG. 1, other embodiments including more than one client and/or fewer or more than four nodes in cluster 110 are within the scope of the present disclosure. Likewise, although one application is illustrated as being deployed on cluster 110, other embodiments including more than one application deployed on cluster 110 is within the scope of the present disclosure. Additionally, for simplicity and clarity the present disclosure illustrates specific labels for the annotations (e.g., "@Clustered", etc.) but these are not intended to be limiting. It should be understood that annotations may have different labels than the examples provided in this disclosure.

III. Example Method

Figure 3:
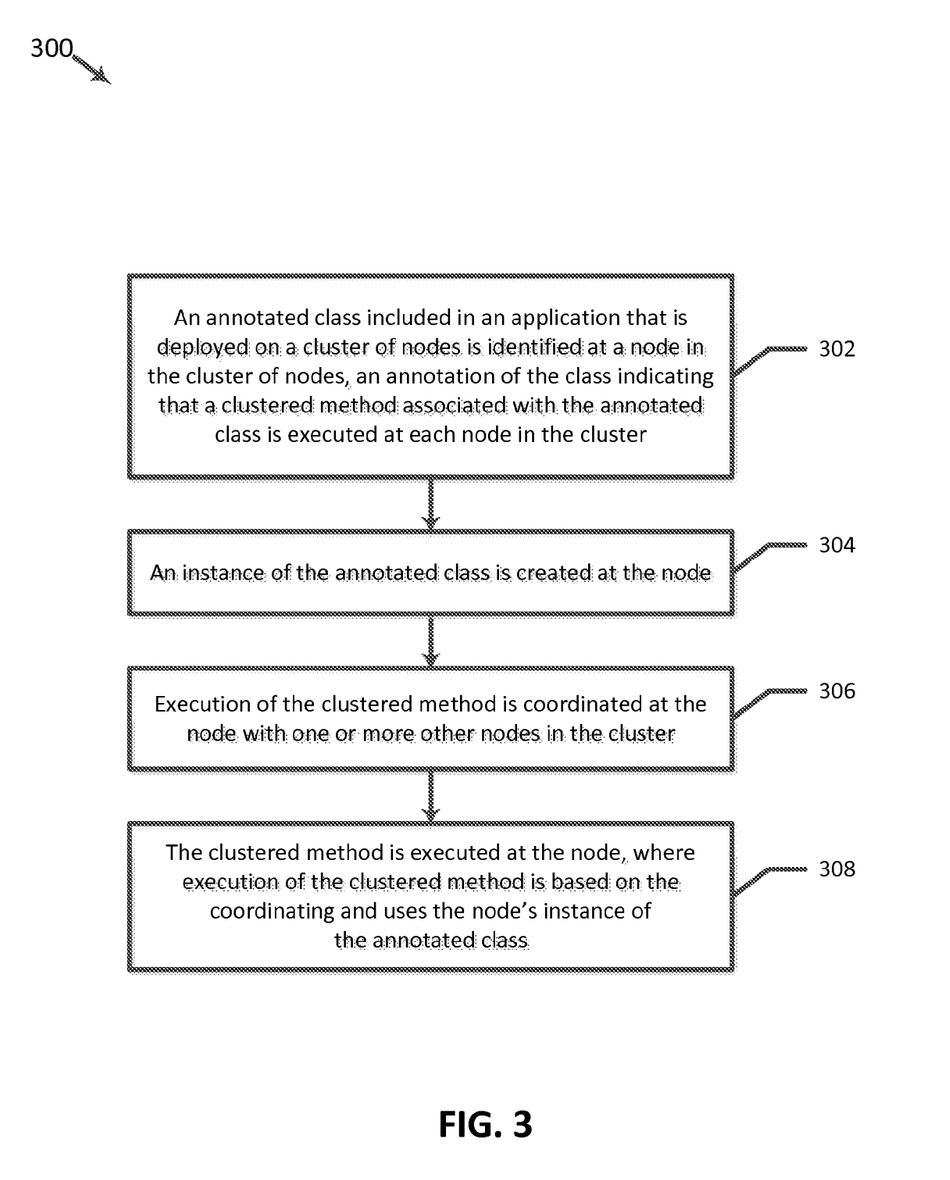
FIG. 3 is a simplified flowchart illustrating a method of executing a clustered method associated with a class that is deployed on a cluster of nodes, according to some embodiments.

FIG. 3 is a simplified flowchart illustrating a method 300 of executing a clustered method associated with a class that is deployed on a cluster of nodes, according to some embodiments. Method 300 is not meant to be limiting and may be used in other applications.

Method 300 includes blocks 302-308. In a block 302, an annotated class included in an application that is deployed on a cluster of nodes is identified at a node in the cluster of nodes, an annotation of the class indicating that a clustered method associated with the annotated class is executed at each node in the cluster. In an example, application 114 is deployed on cluster 110, and node 112A identifies an annotated class 116 included in application 114, an annotation of the class indicating that clustered method 118 associated with annotated class 116 is executed at each node in cluster 110.

In a block 304, an instance of the annotated class is created at the node. In an example, node 112A creates an instance of clustered class 116. Application 114 is deployed on each node in the cluster of nodes, and clustered class 116 is included in application 114. Accordingly, clustered class 116 may also be deployed on each node in the cluster of nodes.

In a block 306, execution of the clustered method is coordinated at the node with one or more other nodes in the cluster. In an example, node 112A coordinates execution of clustered method 118 with one or more other nodes in cluster 110. At node 112A, the coordination of the clustered method execution at the nodes may include coordinating to initiate execution of the clustered method within a threshold period of time from which one or more of the other nodes in the cluster executes the clustered method. The threshold period of time may vary. The clustered method may be invoked on the node's instance of the clustered class. The clustered method may or may not be included in the clustered class.

In a block 308, the clustered method is executed at the node, where the execution of the clustered method is based on the coordinating and uses the node's instance of the annotated class. In an example, node 112A executes, based on the coordinating, clustered method 118 using node 112A's instance of clustered class 116. In an example, execution of clustered method 118 may include accessing a shared variable, which may be of a primitive or collection data type.

In some embodiments, blocks 302-308 may be performed for any number of nodes in cluster 110. It is also understood that additional processes may be inserted before, during, or after blocks 302-308 discussed above. It is also understood that one or more of the blocks of method 300 described herein may be omitted, combined, or performed in a different sequence as desired.

IV. Example Computing System

Figure 4:
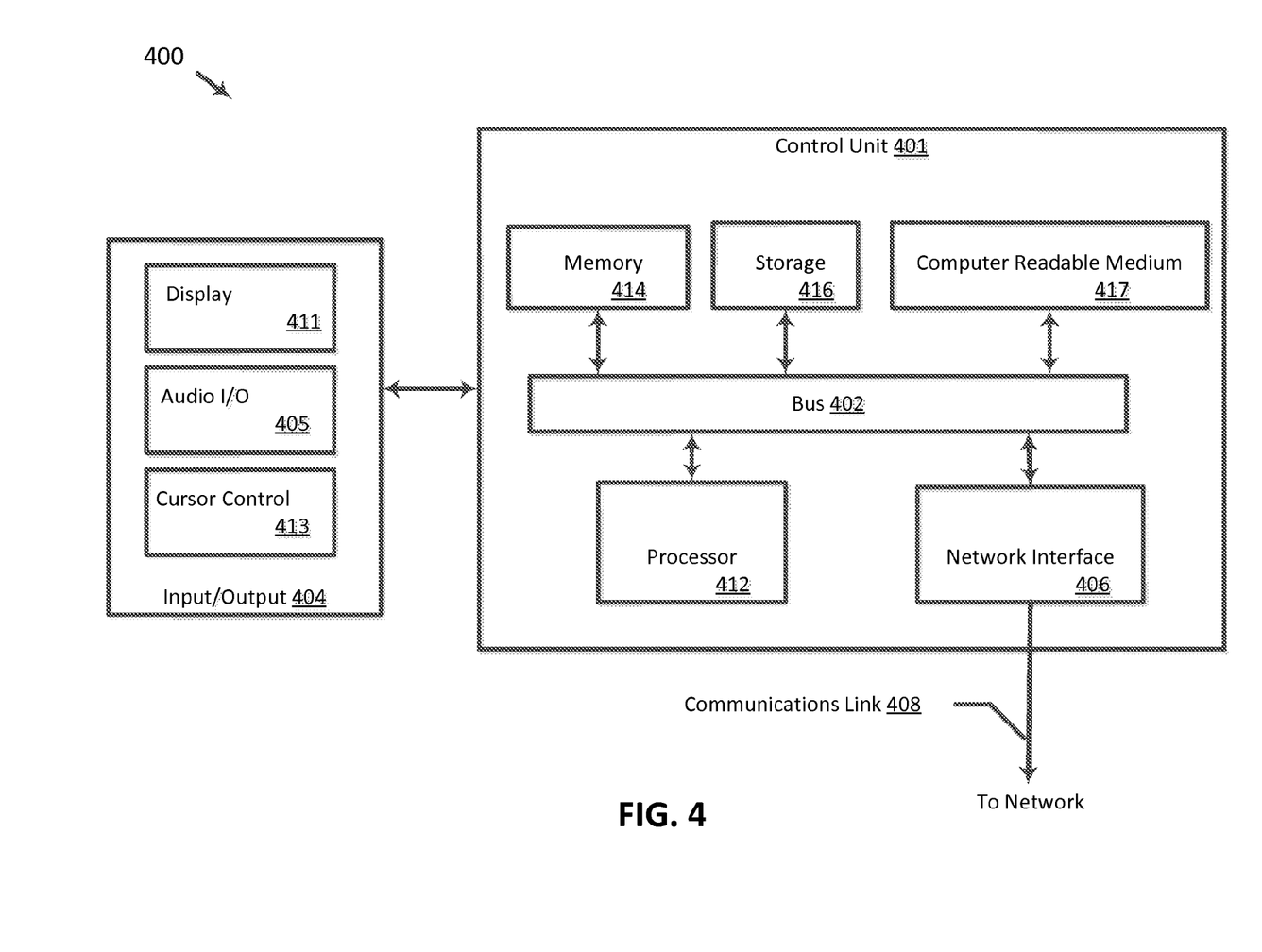
FIG. 4 is a block diagram of an electronic system suitable for implementing one or more embodiments of the present disclosure.

FIG. 4 is a block diagram of an example computer system 400 suitable for implementing any of the embodiments disclosed herein. In various implementations, client 102 and each of the nodes in cluster 110 may be implemented on computer system 400. The computer system 400 may include one or more processors 412. The computer system 400 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 for processing user actions, such as selecting keys from a keypad/keyboard or selecting one or more buttons or links, etc., and send a corresponding signal to bus 402. I/O component 404 may also include an output component such as a display 411, and an input control such as a cursor control 413 (such as a keyboard, keypad, mouse, etc.). In an example, client 102 uses I/O component 404 to send one or more requests 130 to cluster 110.

An audio I/O component 405 may also be included to allow a user to use voice for inputting information by converting audio signals into information signals. Audio I/O component 405 may allow the user to hear audio. A transceiver or network interface 406 transmits and receives signals between computer system 400 and other devices via a communications link 418 to a network. In an embodiment, the transmission is wireless, although other transmission mediums and methods may also be suitable. In some examples, nodes in cluster 110 may communicate with each and with client 102 using communications link 418. In some examples, two or more nodes are located within computer system 400, A processor 412, which may be a micro-controller, digital signal processor (DSP), or other processing component, processes these various signals, such as for display on display 411 of computer system 400 or transmission to other devices via communication link 418. A processor may also control transmission of information, such as cookies or IP addresses, to other devices.

Components of computer system 400 also include a system memory component 414 (e.g., RAM), a static storage component 416 (e.g., ROM), and/or a computer readable medium 417. Computer system 400 performs specific operations by one or more processors 412 and other components by executing one or more sequences of instructions contained in system memory component 414. Logic may be encoded in computer readable medium 417, which may refer to any medium that participates in providing instructions to one or more processors 412 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 414, and transmission media include coaxial cables, copper wire, and fiber optics, including wires that include bus 402. In an embodiment, the logic is encoded in non-transitory computer readable medium. Computer readable medium 417 may be any apparatus that can contain, store, communicate, propagate, or transport instructions that are used by or in connection with processor 412. Computer readable medium 417 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions or blocks described herein may be changed, combined into composite actions or blocks, and/or separated into sub-actions or sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of executing a clustered method at a cluster of nodes, comprising:
at each node in a cluster of nodes:
identifying an annotated class included in an application that is deployed on the cluster of nodes, an annotation of the class indicating that a clustered method associated with the annotated class is executed at each node in the cluster, the annotated class including a variable that is separately maintained by each node in the cluster of nodes, access to the shared variable being synchronized across the cluster of nodes, and a datatype of the shared variable including a collection of variables, wherein a first node in the cluster is assigned a first portion of the collection, a second node in the cluster is assigned a second portion of the collection, and the first portion is different from the second portion;
creating an instance of the annotated class;
coordinating execution of the clustered method with one or more other nodes in the cluster;
executing, based on the coordinating, the clustered method using the respective node's instance of the annotated class; and
updating, based on executing the clustered method, one or more variables of the respective node's assigned portion of the collection.

2. The method of claim 1, wherein coordinating execution of the clustered method includes coordinating to initiate execution of the clustered method within a threshold period of time from which one or more of the other nodes in the cluster executes the clustered method.

3. The method of claim 1, wherein the annotated class includes the clustered method, and wherein the executing the clustered method includes invoking the clustered method on the respective node's instance of the annotated class.

4. The method of claim 1, wherein the annotated class includes a second variable that is separately maintained by each node in the cluster of nodes, and access to the second shared variable is synchronized across the cluster of nodes.

5. The method of claim 4, wherein a data type of the second shared variable is defined as including a set method that updates a value of the second shared variable and is an atomic method, and wherein at most one node updates the value of the second shared variable at a time.

6. The method of claim 4, wherein a data type of the second shared variable is defined as including a lock method and an unlock method, wherein the lock method locks access to the second shared variable, the unlock method unlocks access to the second shared variable, and wherein at most one node locks access to the second shared variable at a time.

7. The method of claim 1, further comprising:
at each of the first and second nodes in the cluster of nodes:
receiving a request from a client;
identifying an annotation of the clustered method indicating a return type that is returned to the client; and
sending, based on the return type, an output of one or more of the executed clustered methods to the client.

8. The method of claim 7, wherein the return type is the collection of variables, and wherein the client receives the collection of variables including an output the clustered method executed at each of the nodes in the cluster.

9. The method of claim 1, further comprising:
deploying, at each node in the cluster of nodes, the application, wherein the deploying includes the identifying, the creating, the coordinating, and the executing.

10. The method of claim 1, wherein a second annotation of the class indicates that execution of the clustered method at each node in the cluster is part of a transaction, wherein each node in the cluster commits the transaction when each node successfully executes the clustered method, and each node in the cluster rolls back the transaction when at least one node in the cluster fails to successfully execute the clustered method.

11. A system for executing a clustered method at a cluster of nodes, comprising:
a cluster of nodes including a first node and a second node, wherein an application is deployed on each node of the cluster of nodes;

wherein the first node identifies, by one or more hardware processors of the first node, an annotated class included in the application, creates a first instance of the annotated class, coordinates execution of the clustered method with the second node, and executes, based on the coordinating, the clustered method using the first instance of the annotated class, wherein an annotation of the class indicates that a clustered method associated with the annotated class is executed at each node in the cluster; and wherein the second node identifies the annotated class included in the application, creates a second instance of the annotated class, and executes, based on the coordinating, the clustered method using the second instance of the annotated class, wherein the annotated class includes a variable that is separately maintained by each node in the cluster of nodes, access to the shared variable is synchronized across the cluster of nodes, and a datatype of the shared variable includes a collection of variables, wherein the first node is assigned a first portion of the collection and updates one or more variables in the portion assigned to the first node, a second node is assigned a second portion of the collection, and the first portion is different from the second portion.

12. The system of claim 11, wherein the first node in the cluster is an application server.

13. The system of claim 11, wherein the annotated class includes a second variable that is shared among the cluster of nodes, and access to the second shared variable is synchronized across the cluster of nodes.

14. The system of claim 13, wherein a data type of the second shared variable is defined as including a set method that updates a value of the second shared variable and is an atomic method, and wherein at most one node updates the value of the second shared variable at a time.

15. The system of claim 13, wherein each of the nodes in the cluster receives a request from a client and identifies an annotation of the clustered method indicating a return type that is returned to the client, and wherein the first node sends, based on the return type, an output of one or more of the executed clustered methods to the client, wherein the return type includes the collection of variables.

16. The system of claim 11, wherein a first version of the shared variable maintained by the first node has a first value at a point in time, and a second version of the shared variable maintained by the second node has a second value at the point in time.

17. The system of claim 11, wherein the annotated class includes the shared variable.

18. The system of claim 11, wherein at least one node in the cluster divides the collection into a plurality of portions and assigns each portion of the plurality of portions to a node in the cluster.

19. The system of claim 11, wherein the second node updates one or more variables in the portion assigned to the second node.

20. A non-transitory machine-readable medium comprising a plurality of machine-readable instructions that when executed by one or more processors is adapted to cause the one or more processors to perform a method comprising:

at each node in a cluster of nodes:
identifying an annotated class included in an application that is deployed on the cluster of nodes, an annotation of the class indicating that a clustered method associated with the annotated class is executed at each node in the cluster, the annotated class including a variable that is separately maintained by each node in the cluster of nodes, access to the shared variable being synchronized across the cluster of nodes, and a datatype of the shared variable including a collection of variables, wherein a first node in the cluster is assigned a first portion of the collection, a second node in the cluster is assigned a second portion of the collection, and the first portion is different from the second portion;

creating an instance of the annotated class;

coordinating execution of the clustered method with one or more other nodes in the cluster;

executing, based on the coordinating, the clustered method using the respective node's instance of the annotated class; and updating, based on executing the clustered method, one or more variables of the respective node's assigned portion of the collection.

* * * * *